March 7, 1967 A. FENER 3,307,323
ANTI-CLOGGING PACKAGING MACHINE
Filed Feb. 23, 1965
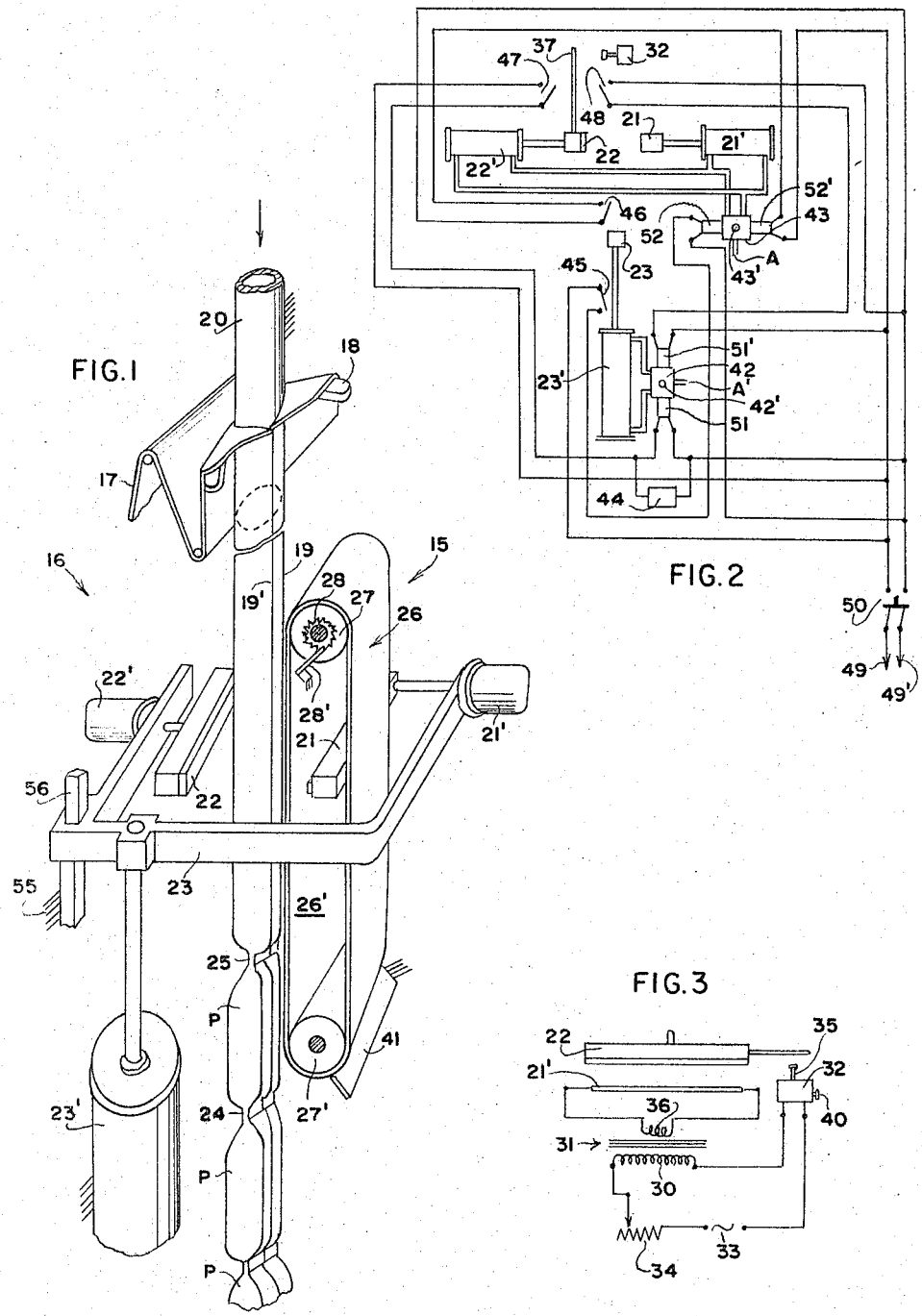
INVENTOR,
Alfred Fener,
BY
ATTORNEY.

United States Patent Office 3,307,323
Patented Mar. 7, 1967

3,307,323
ANTI-CLOGGING PACKAGING MACHINE
Alfred Fener, 422 Beach 146th St.,
Neponsit, N.Y. 11959
Filed Feb. 23, 1965, Ser. No. 434,578
1 Claim. (Cl. 53—180)

The present invention relates to automatic packaging machines of the type in which thermoplastic sheet material from a supply source is intermittently run and formed into successive packets, each filled with a measured amount of given merchandise and sealed by seams transverse the direction of run. The plastic material is positioned between the sealing and pressure bars of a thermal impulse heat sealing device which reciprocates along the plastic material, pulling it while making a transverse seam during each stroke of said device away from the work-entrance end of the machine, and released of it during each return stroke of said device towards the work-entrance end of the machine; said bars being reciprocated so that they come together to accomplish the sealing and pulling operation and are apart during each return stroke of said device.

A grave fault experienced in the operation of this class of machinery, is that the plastic material often adheres to the sealing bar at a transverse seam region though said bars have separated, and so the finished work is brought back towards the work-entrance end of the machine, thus clogging the machine because the heat sealing device as a unit continues to reciprocate along the work while the said bars thereof move towards and away from one another.

It is therefore the principal object of this invention to provide a novel and improved construction in machines of this type, to prevent said clogging.

Another object thereof is to provide novel and improved means for the practice of this invention, which can be easily incorporated in existing machines of this class, to make them free of said clogging.

Still a further object of this invention is to provide a novel and improved anti-clogging means in machinery of the kind described, which is simple in construction, reasonable in cost, requiring no motive power and efficient in carrying out the purposes for which it is designed.

Other objects and advantages will become apparent as this disclosure proceeds.

For one practice of this invention, the packaging machine is provided with an endless belt on spaced rollers; said belt being along the plastic material with the sealing bar between the belt flights and there is a means to allow the belt to move only so that the flight thereof which is between the work and the sealing bar, shall go in the direction the plastic material is pulled while a transverse seam is made thereon.

In the accompanying drawing forming part of this specification, similar characters of reference indicate corresponding parts in all the views.

FIG. 1 is a fragmentary perspective view of a packaging machine embodying this invention.

FIG. 2 is a circuit diagram showing means for one manner of control of the machine's operation.

FIG. 3 is a circuit diagram for the operation of the thermal impulse sealing device of the type used in this machine.

In the specific embodiment shown in the drawing, the numeral 15 designates generally an anti-clogging device incorporated in a well-known type of packaging machine denoted generally by the numeral 16, in which, thermoplastic sheeting 17 coming off a roll not shown, passes over a former 18 which makes of it a tubular form 19, passing downwardly from around a fixed filling tube 20. Such formed plastic tube passes between the sealing bar 21 and its companion pressure bar 22 comprising a heat sealing apparatus of the thermal impulse type; said bars being in horizontal position on opposite arms of a frame-piece 23 for movement towards and away from each other, which may be effected by the respective pneumatic cylinders 21' and 22'. The frame-piece 23 is movable along the vertical, which may be done by the pneumatic cylinder 23', having a stroke length equal to the distance between transverse seams 24 and 25 made on the tube 19 to determine packet size P. A seaming device of the thermal impulse type not shown, positioned between the former means 18 and the upper position of the vertically movable frame-piece 23, seals the meeting overlapping longitudinal edges of the tube form 19; such seam being indicated by the line 19'. The tube 20 in leading the plastic tube 19, has a definite path determined for said tube 19 through the machine.

As is well known, this machine includes suitable mechanism shown herein although this invention is not concerned therewith specifically, for the control and operation of the cylinders 21', 22', 23', as well as a filling apparatus for depositing a measured amount of merchandise through the filling tube 20, all in proper timed relation so that filling is done while the frame 23 rises, during which time the bars 21 and 22 are apart to clear the plastic tube 19. At the raised position of the frame 23, the filling has been completed and said bars 21 and 22 are brought together and the sealing operation effected to make a transverse seam above the seam 25 so the last deposit of fill is enveloped. Said bars 21, 22 continue their grip on the work during the entire downward movement of the frame 23, and of course pull the tube 19 downward, thereby forming a new portion of plastic tubing which comes down from around the filling tube 20. When the frame 23 is at its lowest position, the bars 21, 22 move apart and the frame 23 rises. The machine automatically repeats this cycle endlessly for as long as it is run.

The flight 26' of the flat belt 26 on the rollers 27, 27', is along the tube 19, between said tube and the sealing bar 21; said sealing bar being between the flights of said belt and parallel to said belt-supporting rollers. On the shaft of one of said rollers, there is fixed a ratchet wheel 28 engaged by a fixed spring pawl 28', arranged to allow the belt 26 to move only so its flight 26' can move downwardly in the specific packaging machine 16 illustrated.

The sealing device which includes the sealing bar 21 and the pressure bar 22, is of the thermal impulse type, operating on the well known principle as is set forth for instance in the Langer Patent No. 2,460,460 and in the Fener and Langer Patent No. 2,796,913, which may be referred to for details of structure of said bars which cooperate to seam thermoplastic films interposed between them, and a circuit for actuating the heater tape 21' which is along the surface of the sealing bar facing the pressure bar, is shown in FIG. 3 herein, wherein the primary winding 30 of a step-down transformer 31 and a time delay switch 32, are connected as a group across the terminals of a source of alternating current 33. A rheostat 34 may be interposed in said group. Said time delay switch is of the type which closes an electric circuit upon its actuating plunger 35 being depressed, and automatically opens said circuit, a predetermined time delay period thereafter; the length of such time delay being adjustable by means of the adjusting screw 40. This switch means is well known in the art, so no further description or showing thereof is necessary. The secondary winding 36 of said transformer is connected across the heater tape 21'.

The belt 26' like the covering on the heating element 21', is a thin fabric woven with glass fibers (Fiberglas) and impregnated or coated with tetrafluorethylene (Teflon), which is preferred because of its adhesion-resisting quality. Said heating element is within the confines of the longitudinal edges of said belt.

FIG. 1 shows the packaging machine 16 in the condition where its reciprocating frame 23 is nearly at its uppermost position, a measured amount of material has come down the feeding tube 20 and settled in the plastic tube portion immediately above the last transverse seam made which is indicated at 25, and the sealing bar 21 and the pressure bar 22, are already moving towards each other so when the frame 23 has reached its highest position, said bars will be making a new seam. Mechanism shown, for controlling the proper timed operation of the filling means and the pneumatic cylinders 21', 22', 23', is of course working. In coming together, said bars 21, 22 will flatten the plies of the tube 19 and hold them clamped against the belt flight 26'. During such movement of said bars, an arm 37 on one of them, will depress the plunger 35 and thus activate the time switch 32, thereby closing the secondary circuit of the transformer, to direct a pulse of current through the heating element 21', so the clamped plies of the tube 19 will be sealed during the first part of the time the frame 23 travels downward. Such clamping action continues until the frame 23 has moved downward to its lowermost position, and of course, the tube 19 will be pulled downward with the belt flight 26', a distance which equals the spacing of successive transverse seams on the work, while more of such tubular form will be made of the fresh length of plastic passing the former means 18. Now, the bars 21, 22 of the heat sealing device move apart and the frame 23, starts to move upwardly.

Disregarding for a moment the presence of the belt 26 and its appurtenances, it is at this point in the cycle of operation that trouble usually starts if the work sticks to the sealing bar 21, as was the experience in packaging machines of this class heretofore. It may be noted that it is extremely unusual for the work ever to stick to the pressure bar 22. It is evident that clogging would soon occur because the work would move up and down with the frame 23, and the bars 21, 22 would continue to reciprocate towards and away from each other to perform sealing and pulling operations.

The presence of the anti-clogging device 15 avoids this. The work might stick to the belt flight 26', and said flight might stick to the sealing bar 21. But now, upon upward movement of the frame 23, the sealing bar 21 must free itself of the belt, because said belt flight cannot move upward due to the action of the ratchet wheel 28 and its cooperating pawl 28'. Also, at all succeeding downward movements of the frame 23, the work will leave the belt when the stuck seam comes to the underside of the lower roller 27'. As a further precaution there may be a doctor blade 41, slightly away from the belt at the underside of said roller.

If the nature of the thermoplastic sheeting 17 is such that it would stick to the pressure bar 22, the machine may be provided with another anti-clogging device as 15 for the pressure bar 22, which is believed readily understood without further illustration.

One manner of control means is shown in FIG. 2, for having the bars 21 and 22 together during the downward movement of the frame-piece 23, and apart during its upward movement and for accomplishing the filling operation, employs the solenoid-operated valves indicated generally by the numerals 42 and 43, a time-controlled filling means diagrammatically indicated at 44 which is electrically operated, and the normally open microswitches 45, 46, 47, 48, in a circuit powered by the supply mains 49, 49' in which is interposed the doublepole, double throw switch 50 which latter is closed for the machine to operate. These components are well known in the automatic machine art and need no further explanation.

The valve 42 includes the solenoids 51, 51' and has pipe connections to the respective ends of the cylinder 23'. When the solenoid 51 is actuated, the valve is set in condition to direct a compressed air supply entering at A', into the bottom end of the cylinder 23' and will connect the upper end of said cylinder with the atmosphere through the port 42'. This will cause the frame-piece 23 to rise. When the solenoid 51' is actuated, said valve 42 is set in condition to direct the compressed air supply entering at A', into the top end of said cylinder 23' and will connect the lower end of said cylinder with the atmosphere through the port 42'. This will cause the frame-piece to descend.

The valve 43, which is identical with the valve 42, includes the solenoids 52, 52' and has pipe connections common to the inward ends of the cylinders 21', 22' and other pipe connections common to the outward ends of said pair of cylinders. When the solenoid 52 is actuated, said valve 43 is set in condition to direct a compressed air supply entering at A, into the inward ends of said pair of cylinders and will connect the outer ends of said cylinders with the atmosphere through the port 43'. This will cause the bars 21 and 22 to move apart. When the solenoid 52' is actuated, said valve 43 is set in condition to direct the compressed air supply entering at A, into the outward ends of said pair of cylinders and will connect the inner ends of said cylinders with the atmosphere through said port 43'. This will cause said bars 21 and 22 to move towards each other.

At the lowermost position of the frame-piece 23, it will close the switch 45, and at near its uppermost position, said frame-piece will close the switch 46. The pressure bar 22 when at its innermost position, will have its extending arm 37, close the switch 48 as well as actuate the timing switch 32. Said pressure bar when at its outermost position, will have its said extending arm close the switch 47. The electrically-operated, time-controlled filling means 44 is in parallel connection with the solenoid 51, so upon actuation of said solenoid 51, said filling means control 44 will also be actuated.

Each solenoid is to be connected to receive current from the supply lines 49, 49', so in the circuit of each solenoid, one of the switches is interposed. The switch 45 is interposed in the circuit of the solenoid 52. The switch 46 is interposed in the circuit of the solenoid 52'. The switch 47 is interposed in the circuit of the solenoid 51. The switch 48 is interposed in the circuit of the solenoid 51'. For the machine to run, the switch 50 is closed and the power supply 33 is activated.

The general frame of the machine 16, indicated by the numeral 55, has a vertical track rail 56 on which the frame-piece 23 is slidably mounted, and such frame 55 also carries the items 20, 23', 41, the shafts of the rollers 27 and the switches 45 and 46. The frame-piece 23, because of its function to transport the heat-sealing device, may be deemed a carriage which moves on the frame 55. The switches 32, 47 and 48 may be on either the frame 55 or the carriage 23. It is also to be noted that the width of the belt 26 shall at least equal the effective heating length of the sealing bar 21, which in the appended claim is called the length of the sealing bar.

This invention is capable of numberous forms and various applications without departing from the essential features herein disclosed. It is therefore intended and desired that the embodiment shown herein shall be deemed merely illustrative and not restrictive and that the patent shall cover all patentable novelty herein set forth; reference being had to the following claim rather than to the specific showing and description herein to indicate the scope of this invention.

I claim:

In a packaging machine including a carriage on a frame, an electric heat sealing device of the thermal impulse type having a sealing bar opposite and parallel to a pressure bar; said bars being relatively movable towards and away from each other, said device being mounted on said carriage, means to guide continuous thermoplastic film material across and between said bars in a path, means to reciprocate said carriage between a first limit position adjacent said film guide means, and a second limit position spaced from said film guide means and parallel to said path and means to move said bars towards each other to clamp said film material when said carriage is at its first limit position and to move said bars apart to release said film material when said carriage is at its second limit position, the improvement comprising a pair of spaced rollers mounted on the frame, the axes of said rollers being parallel to said bars; a thin flat adhesion resistant belt having a width at least equal to the length of the sealing bar trained over said rollers, one flight of said belt being between said sealing bar and said path at all positions of said carriage, and means allowing the belt to move only so that the movement of said flight is in said direction, the belt being of material uneffecting the operation of the sealing device to seal plies of thermoplastic material which may be interposed between said bars and having the nature to resist adhesion; said rollers being mounted on said frame by a ratchet device for movement only in one direction, whereby said bars will seal said film material and clamp said flight for movement with the carriage from said first to said second positions, and said flight will be at rest during return movement of said carriage.

References Cited by the Examiner

UNITED STATES PATENTS

| | | |
|---|---|---|
| 1,711,228 | 4/1929 | Duvall et al. |
| 2,624,992 | 1/1953 | Salfisberg _____ 53—180 |
| 2,738,828 | 3/1956 | Hammer _____ 53—180 XR |
| 2,899,875 | 8/1959 | Leasure _____ 53—180 XR |
| 3,011,934 | 12/1961 | Bursak _____ 53—180 XR |

GRANVILLE Y. CUSTER, JR., *Primary Examiner.*